(No Model.)
W. F. LUDWICK.
HARROW.
No. 455,256. Patented June 30, 1891.
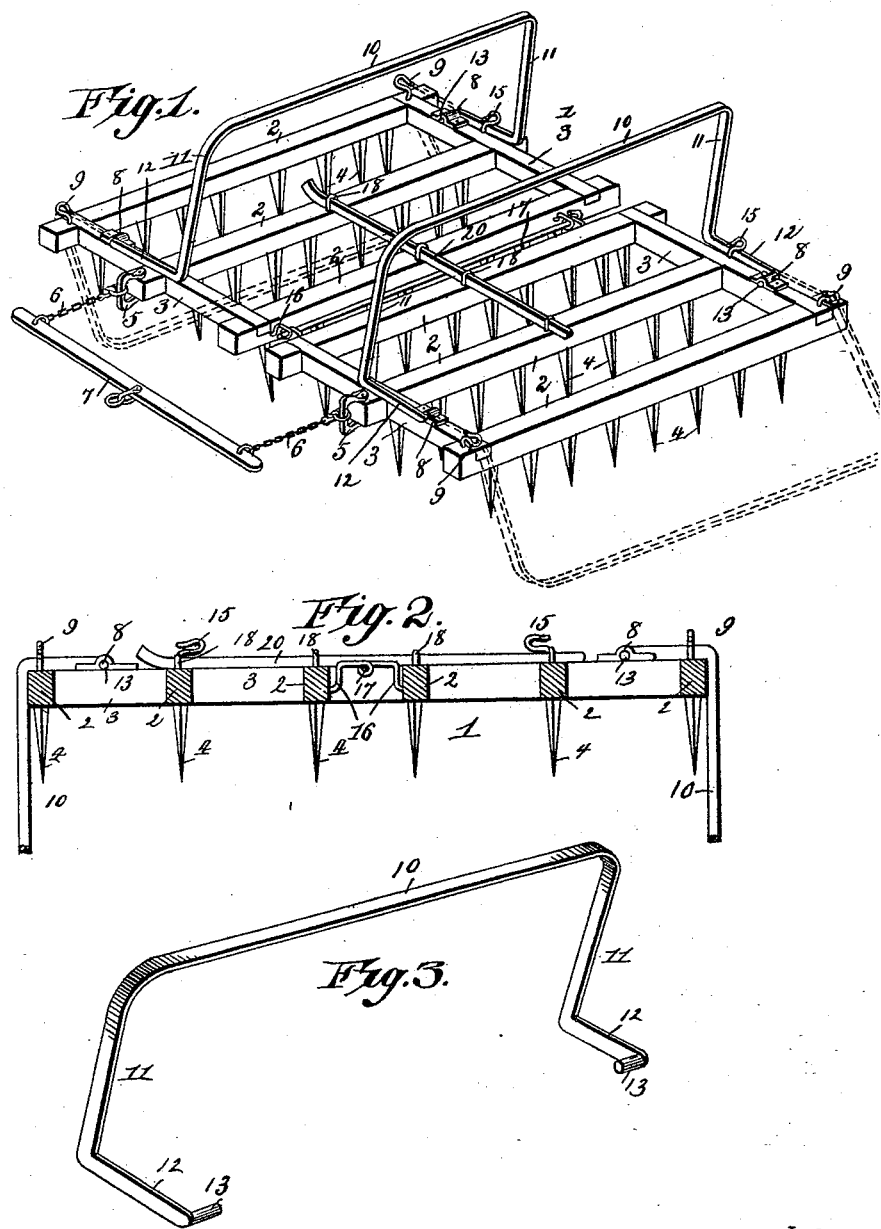
Witnesses:
H. C. Dieterich,
W. S. Duvall
Inventor
William F. Ludwick
By his Attorneys,
C. A. Snow & Co.

United States Patent Office.

WILLIAM F. LUDWICK, OF BEAUMONT, KANSAS.

HARROW.

SPECIFICATION forming part of Letters Patent No. 455,256, dated June 30, 1891.

Application filed September 2, 1890. Serial No. 363,761. (No model.)

*To all whom it may concern:*

Be it known that I, WILLIAM F. LUDWICK, a citizen of the United States, residing at Beaumont, in the county of Butler and State of Kansas, have invented a new and useful Harrow, of which the following is a specification.

This invention has relation to improvements in harrows, and the objects of the invention are to provide means for readily transporting the harrow from field to field or to and from the field without the necessity of loading the same upon wagons.

A further object of the invention is to provide means for conveniently lifting the harrows out of gulleys, over obstructions, and to free the teeth of the same of trash, and in certain classes of harrows to provide means for locking said harrow-frame sections in rigid connection with each other.

With the above general objects in view the invention consists in certain features of construction hereinafter specified, and particularly pointed out in the claim.

Referring to the drawings, Figure 1 is a perspective of a harrow constructed in accordance with my invention, the same being adapted for use as a harrow. Fig. 2 is a section, the harrow being raised and adapted for moving from the field. Fig. 3 is a detail in perspective of one of the combined runners and handles.

Like numerals of reference indicate like parts in all the figures of the drawings.

1 1 designate rectangular harrow-frame sections, both of ordinary construction, and each comprising in this instance three longitudinal bars 2, connected near their ends by transverse end bars 3, said bars being provided with the usual number and character of teeth 4. The two central bars at their corresponding ends are provided with draft-links or clevises 5, to which are connected draft-chains 6, the ends of said chains being connected to the singletree 7, and through the medium of these connections the harrow is dragged in the usual manner. Each of the end bars 3, near their outer ends, are provided with bearing-clips 8, as shown, and the outer longitudinal bars of each section 1 are provided with swiveled L-shaped locking bolts or keepers 9.

10 designates the runners, of which there are two. Each of said runners is provided with upturned ends 11, which near their extremities are inwardly bent, as at 12, at a right angle to the upturned ends, and said extremities are inwardly and oppositely bent to form bearings 13, which take into the bearing-clips 8, whereby each runner is pivoted to its respective section and may be swung down, so as to take under or below the same, and thus elevate the section until the harrow-teeth are above the ground, or may be swung over and upon its section, thus lowering the teeth into contact with the ground, as desired. It will be observed that when the runners are in position to serve their functions as such the harrow may be dragged from place to place behind a wagon, farm-machine, or by a team, without permitting the teeth of the harrow to come in contact with the ground. Furthermore, that by throwing the runners over upon the frames or sections the harrows are permitted to perform their usual functions, and the runners, being located at the opposite sides of the two sections, will serve the purpose of lifting-handles for the purpose of raising the harrow-sections over obstacles to free the teeth from trash, &c.

When in a lowered position, the runners may be locked rigidly in such position by means of the swiveled keepers 9, which are given a partial rotation until they take over the right-angular portions 12 of the runners. When it is desired to employ the harrow as such, the runners, as before stated, are swung upon the frames or sections, and a locking swiveled keeper 15, one of which is located upon each of the central bars of the frames, takes the place of the similar keepers 9, and thus said runners are locked in a raised and vertical position and serve the function of handles. The sections may be connected flexibly by any suitable means, in this instance opposite pairs of eyebolts 16, connected by a rod 17, serving the purpose.

The inner longitudinal and central longitudinal bars of the section are each provided with a staple 18, said staple being in transverse alignment, and when it is desired to transport the harrow the entire series of staples are connected by a transverse centrally-located locking-bar 20, which transforms the two sections into one rigid frame. When not in use, the locking-bar may be laid loosely upon the sections.

Having thus described my invention, what I claim is—

The combination, with the two rectangular harrow-sections hinged at their adjacent edges, each of said sections comprising a series of longitudinal and end connecting-bars, of a pair of opposite runners, one located at the outer side of each section and each provided with upturned portions near their ends, said portions being laterally bent and terminating in inwardly-turned bearing ends, clips mounted on the sections for the reception of said bearing ends, and swiveled locking-bolts for overlapping the laterally-bent portions of the runners when in either their raised or lowered position, substantially as specified.

In testimony that I claim the foregoing as my own I have hereto affixed my signature in presence of two witnesses.

WILLIAM F. LUDWICK.

Witnesses:
E. A. CORNEIL,
H. S. LUDWICK.